United States Patent
Luo

(10) Patent No.: US 12,435,821 B1
(45) Date of Patent: Oct. 7, 2025

(54) QUICK-INSERTION CONNECTION STRUCTURE FOR PROFESSIONAL ATOMIZER FOAM CANNON

(71) Applicants: Kangkang Tong, Taizhou (CN); Huafeng Luo, Taizhou (CN)

(72) Inventor: Zhenhang Luo, Taizhou (CN)

(73) Assignees: Kangkang Tong, Taizhou (CN); Huafeng Luo, Taizhou (CN)

( * ) Notice: Subject to any disclaimer, the term of this patent is extended or adjusted under 35 U.S.C. 154(b) by 0 days.

(21) Appl. No.: 19/209,609

(22) Filed: May 15, 2025

(51) Int. Cl.
F16L 37/098 (2006.01)
F16L 37/107 (2006.01)

(52) U.S. Cl.
CPC ......... F16L 37/0982 (2013.01); F16L 37/107 (2013.01)

(58) Field of Classification Search
CPC . F16L 37/0982; F16L 37/0847; F16L 37/098; F16L 37/107; F16L 37/248
See application file for complete search history.

(56) References Cited

U.S. PATENT DOCUMENTS

| | | | | |
|---|---|---|---|---|
| 4,796,856 A * | 1/1989 | Munini | ................. | F16L 37/098 285/321 |
| 6,880,587 B1 * | 4/2005 | Carter | ................. | F16L 37/0982 251/149.6 |
| 10,465,827 B2 * | 11/2019 | Klein | ................. | F16L 37/0982 |
| 2004/0238777 A1 * | 12/2004 | Yang | ................. | F16L 37/107 251/149.6 |
| 2008/0157520 A1 * | 7/2008 | Ryhman | ................. | F16L 37/098 285/322 |
| 2013/0167841 A1 * | 7/2013 | Sheffer | ................. | F16L 37/0982 128/202.27 |
| 2015/0145243 A1 * | 5/2015 | Dude | ................. | F16L 37/0982 285/308 |
| 2019/0001112 A1 * | 1/2019 | Takeuchi | ................. | F16L 37/098 |
| 2019/0022344 A1 * | 1/2019 | Lau | ................. | F16L 37/107 |
| 2023/0265954 A1 * | 8/2023 | Peron | ................. | F16L 37/098 285/321 |

FOREIGN PATENT DOCUMENTS

| | | | | |
|---|---|---|---|---|
| EP | 4016546 A1 * | 6/2022 | ............ | F16L 37/107 |
| WO | WO-2005024284 A1 * | 3/2005 | ............ | F16L 37/098 |

* cited by examiner

*Primary Examiner* — Zachary T Dragicevich
*Assistant Examiner* — Fannie Kee
(74) *Attorney, Agent, or Firm* — Law Offices of Sandy Lipkin; Sandy Lipkin

(57) ABSTRACT

A quick-insertion connection structure for a professional atomizer foam cannon, including a venturi tube sheath, a foam nozzle mounting base, a pressure plate adjustment sheath, and a quick-release knob, wherein an end of the venturi tube sheath is provided with a limit elastic piece, and an end of the limit elastic piece is provided with a limit buckle; an end of the foam nozzle mounting base is provided with a guide hole, and an opposite end of the foam nozzle mounting base is provided with a first limit ledge; a snap-slot is disposed between the guide hole and the first limit ledge, the snap-slot being provided with a limit hole adapted to the limit buckle; an end of the quick-release knob is provided with a second limit ledge, and an inner cavity wall of the quick-release knob is provided with a third limit ledge.

7 Claims, 5 Drawing Sheets

QUICK-INSERTION CONNECTION STRUCTURE FOR PROFESSIONAL ATOMIZER FOAM CANNON

CROSS REFERENCE TO RELATED APPLICATIONS

The present disclosure claims the priority of Chinese Patent Application No. 202423066808.8 filed on Dec. 12, 2024, the disclosure of which is incorporated in its entirety by reference herein.

TECHNICAL FIELD

The present disclosure relates to the technical field of spray gun accessories, and particularly to a quick-insertion connection structure for a professional atomizer foam cannon.

BACKGROUND

The professional atomizer foam cannon is a tool for generating foam during car washing, primarily relying on high-pressure water supplied by a car wash machine to produce foam. Its working principle involves: forming a narrow water flow through a nozzle using the high-pressure water generated by the car wash machine, creating a high-pressure gun with a rapidly flowing water jet; the water jet enters a negative pressure chamber of the professional atomizer foam cannon to generate negative pressure, thereby drawing in car wash liquid and air, which are mixed and then passed through a foam core to produce foam.

However, in prior art, impurities present in tap water are intercepted by the foam core, and prolonged accumulation leads to clogging. Additionally, car wash liquids contain thickening agents, and higher viscosity results in suboptimal foaming performance or even obstruction of the foam core.

SUMMARY

The technical problem to be solved by the present disclosure is to provide a quick-insertion connection structure for a professional atomizer foam cannon that facilitates disassembly or assembly and convenient cleaning of the foam core.

To address the aforementioned technical problem, the technical solution of the present disclosure is as follows:

A quick-insertion connection structure for a professional atomizer foam cannon includes a venturi tube sheath, a foam nozzle mounting base, a pressure plate adjustment sheath, and a quick-release knob, in which an end of the venturi tube sheath is provided with a limit elastic piece, and an end of the limit elastic piece is provided with a limit buckle; an end of the foam nozzle mounting base is provided with a guide hole, and an opposite end of the foam nozzle mounting base is provided with a first limit ledge; a snap-slot is disposed between the guide hole and the first limit ledge, the snap-slot being provided with a limit hole adapted to the limit buckle; a connection slot is disposed between the snap-slot and the first limit ledge, and a notch is provided on a side of the snap-slot; an end of the pressure plate adjustment sheath is provided with a connection buckle, the connection buckle being disposed in the connection slot; an end of the quick-release knob is provided with a second limit ledge, an inner cavity wall of the quick-release knob is provided with a third limit ledge, the second limit ledge is disposed on a side of the snap-slot, the third limit ledge is disposed in the snap-slot, and the third limit ledge is adapted to the notch.

In some implementations, an end of the guide hole tapers towards an opposite end thereof.

In some implementations, both ends of the third limit ledge are provided with inclined ledge structures.

In some implementations, an outer sidewall of the quick-release knob is provided with a plurality of anti-slip ribs.

In some implementations, an inner wall of the guide hole is provided with a mounting groove.

In some implementations, an inner cavity wall of the foam nozzle mounting base is provided with a support ledge.

In some implementations, an inner diameter of the pressure plate adjustment sheath is greater than an outer diameter of the foam nozzle mounting base, and an outer diameter of the pressure plate adjustment sheath is greater than an inner diameter of the third limit ledge.

According to the above technical solution, since the second limit ledge is disposed on a side of the snap-slot and the third limit ledge is disposed within the snap-slot, rotating the quick-release knob actuates the third limit ledge to disengage the limit buckle on the limit elastic piece of the venturi tube sheath, thereby enabling quick detachment and attachment of the venturi tube sheath. This facilitates cleaning, maintenance, and replacement of the foam core.

Figure 1:
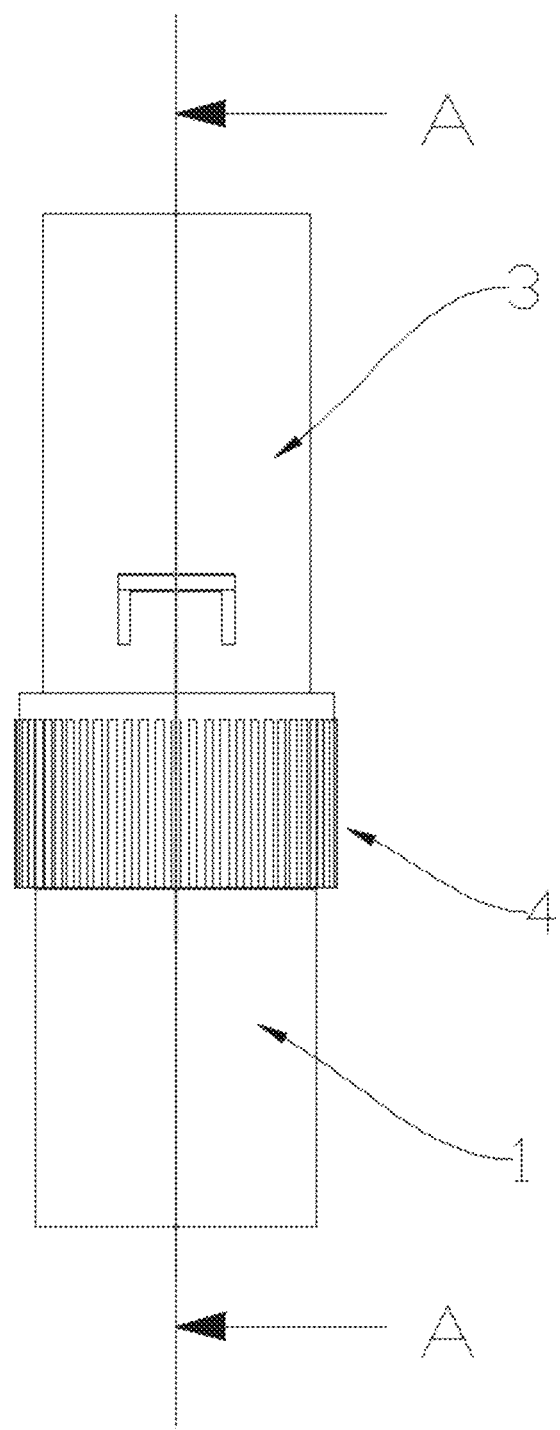
FIG. 1 is a front view of an embodiment of the present disclosure.

Reference numerals: 1 venturi tube sheath; 2 foam nozzle mounting base; 3 pressure plate adjustment sheath; 4 quick-release knob; 5 limit elastic piece; 6 limit buckle; 7 guide hole; 8 first limit ledge; 9 snap-slot; 10 limit hole; 11 connection slot; 12 notch; 13 connection buckle; 14 second limit ledge; 15 third limit ledge; 16 anti-slip rib; 17 mounting groove; 18 support ledge.

DETAILED DESCRIPTION

The specific embodiments of the present disclosure will be described in detail below with reference to the accompanying drawings. It should be noted that the descriptions of these embodiments are intended to assist in understanding the present disclosure but shall not be construed as limitations thereto. Furthermore, the technical features involved in various embodiments of the present disclosure described below may be combined with each other as long as they do not constitute a conflict with each other.

Figure 2:
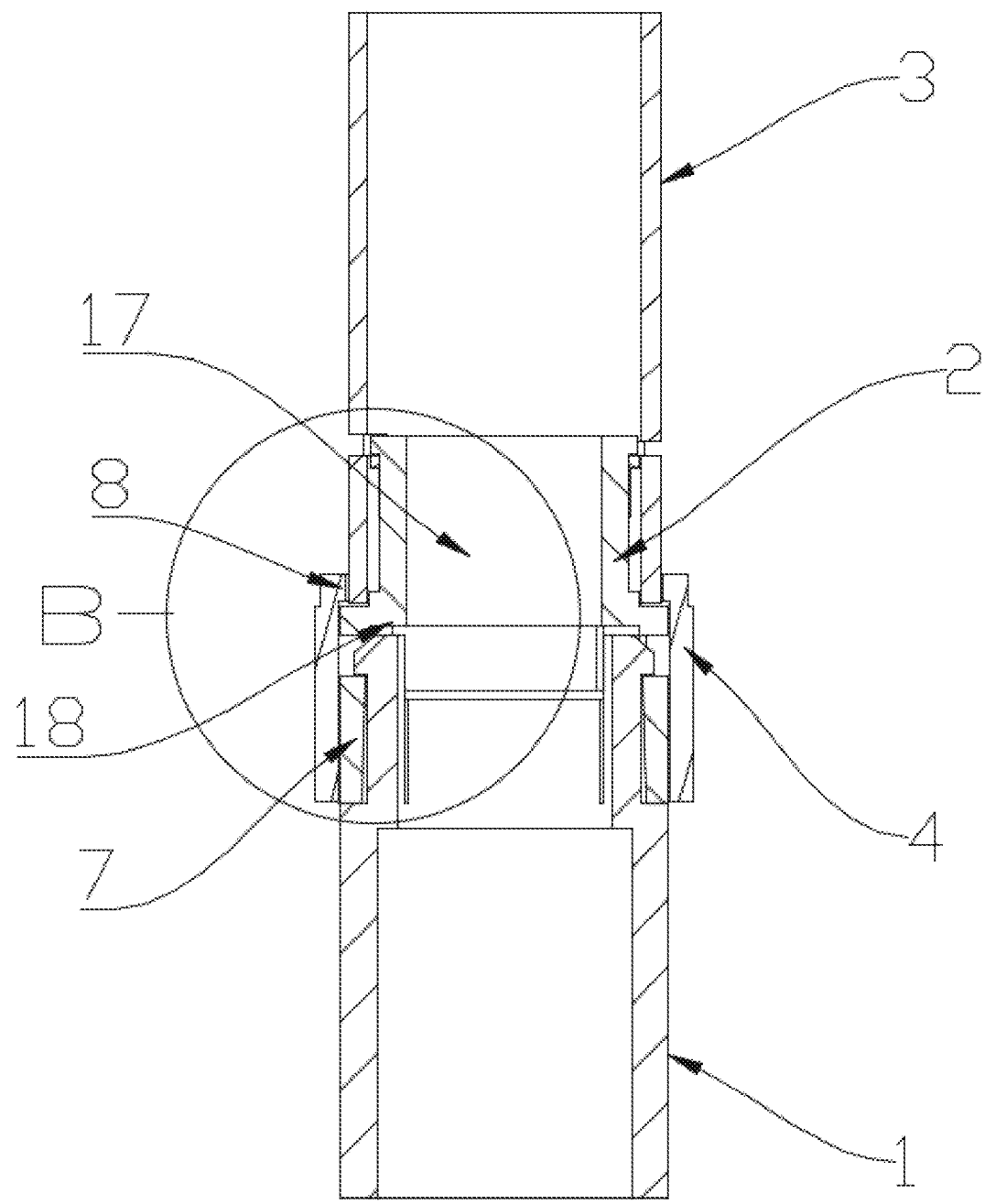
FIG. 2 is a cross-sectional view taken along line A-A in FIG. 1.
Figure 3:
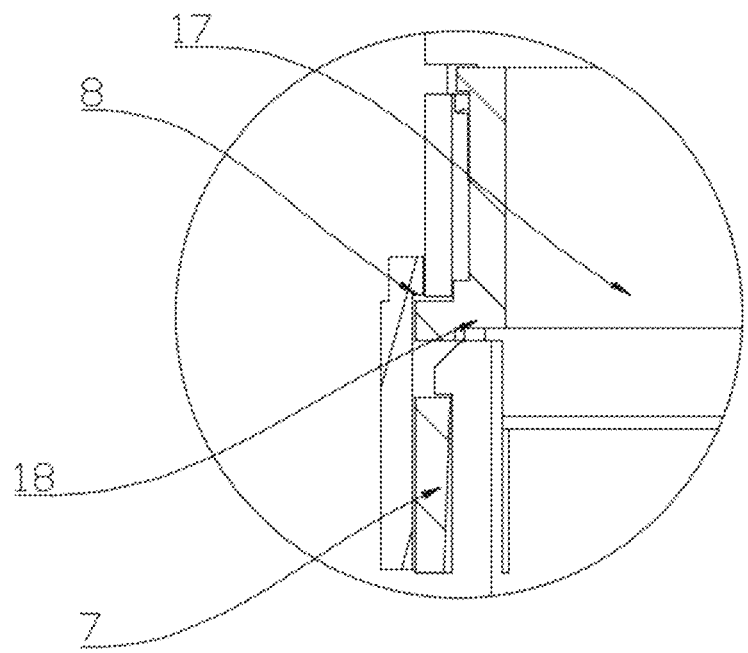
FIG. 3 is a partial enlarged view of portion B in FIG. 2.
Figure 4:
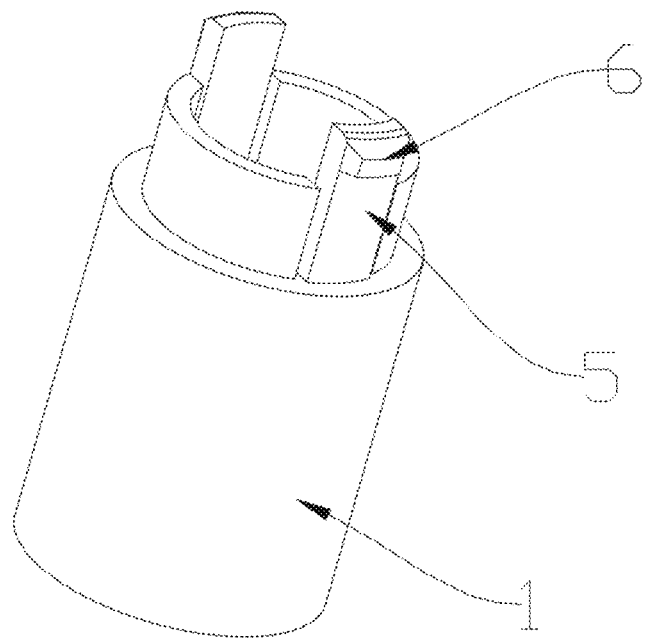
FIG. 4 is a schematic structural view of the venturi tube sheath of the present disclosure.
Figure 5:
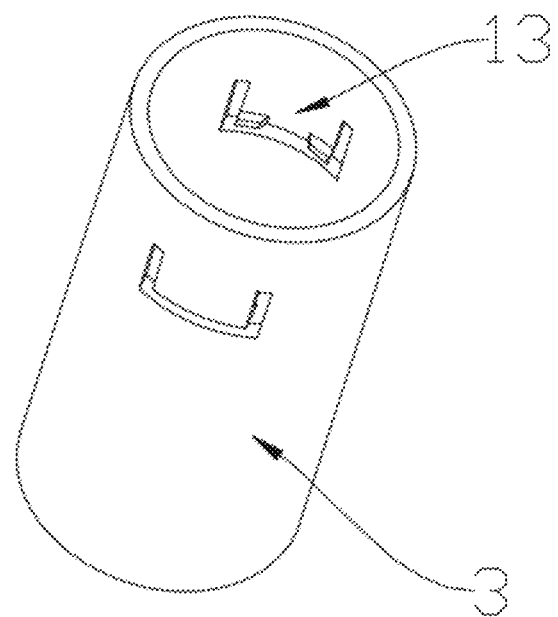
FIG. 5 is a schematic structural view of the pressure plate adjustment sheath of the present disclosure.
Figure 6:
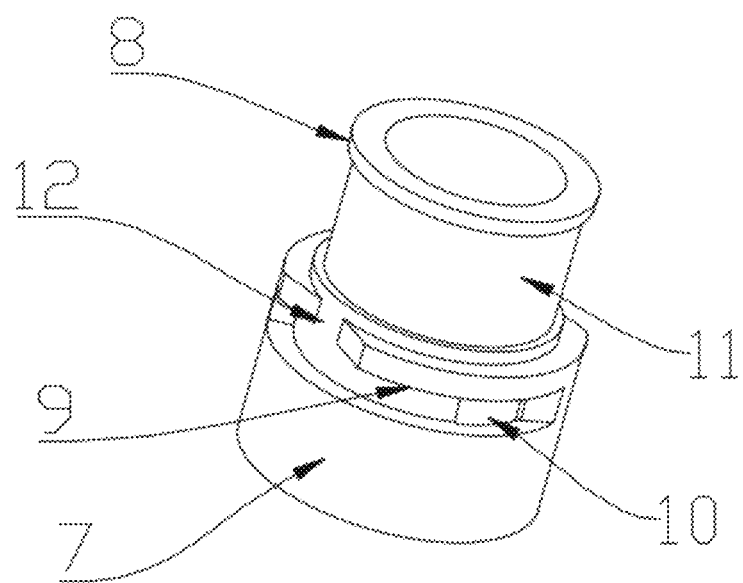
FIG. 6 is a schematic structural view of the foam nozzle mounting base of the present disclosure.
Figure 7:
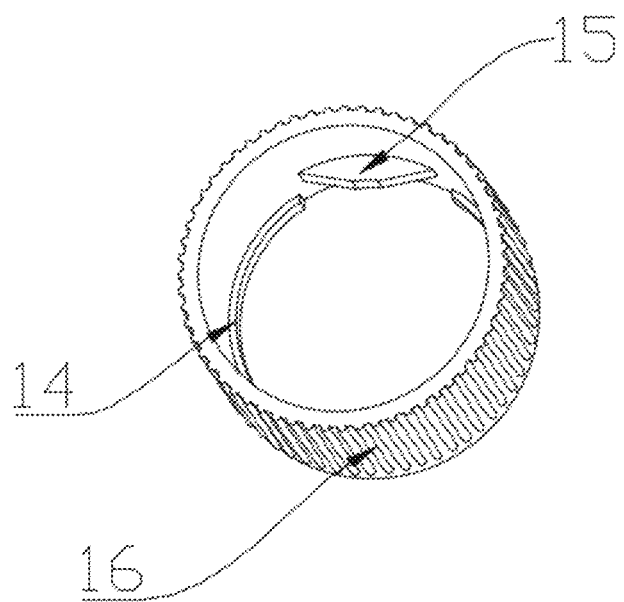
FIG. 7 is a first schematic structural view of the quick-release knob of the present disclosure.
Figure 8:
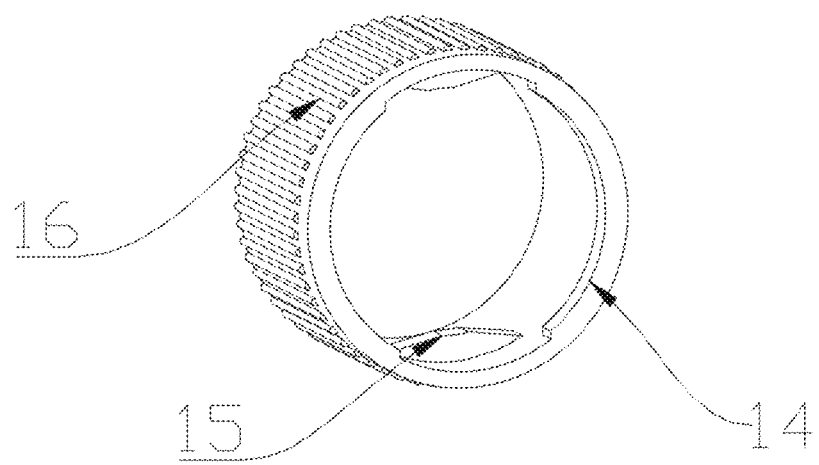
FIG. 8 is a second schematic structural view of the quick-release knob of the present disclosure.

As shown in FIGS. 1 to 8, a quick-insertion connection structure for a professional atomizer foam cannon includes a venturi tube sheath 1, a foam nozzle mounting base 2, a pressure plate adjustment sheath 3, and a quick-release knob 4, in which an end of the venturi tube sheath 1 is provided with a limit elastic piece 5, and an end of the limit elastic piece 5 is provided with a limit buckle 6; an end of the foam nozzle mounting base 2 is provided with a guide hole 7, and an opposite end of the foam nozzle mounting base 2 is provided with a first limit ledge 8; a snap-slot 9 is disposed between the guide hole 7 and the first limit ledge 8, the snap-slot 9 being provided with a limit hole 10 adapted to the limit buckle 6; a connection slot 11 is disposed between the snap-slot 9 and the first limit ledge 8, and a notch 12 is provided on a side of the snap-slot 9; an end of the pressure plate adjustment sheath 3 is provided with a connection buckle 13, the connection buckle 13 being disposed in the connection slot 11; an end of the quick-release knob 4 is provided with a second limit ledge 14, an inner cavity wall of the quick-release knob 4 is provided with a third limit ledge 15, the second limit ledge 14 is disposed on a side of the snap-slot 9, the third limit ledge 15 is disposed in the snap-slot 9, and the third limit ledge 15 is adapted to the notch 12.

In some implementations, an end of the guide hole 7 tapers towards an opposite end thereof, facilitating installation of the limit elastic piece 5 and enhancing connection strength of the limit elastic piece 5.

In some implementations, both ends of the third limit ledge 15 are formed with inclined ledge structures, enabling the quick-release knob 4 to rapidly dislodge the limit buckle 6 of the limit elastic piece 5, thereby achieving rapid disassembly and assembly of the venturi tube sheath 1.

In some implementations, an outer sidewall of the quick-release knob 4 is provided with a plurality of anti-slip ribs 16. In the present embodiment, ten anti-slip ribs 16 are disposed, which enhances frictional engagement between the quick-release knob 4 and a user's palm during operation, thereby facilitating detachment or attachment of the venturi tube sheath 1 and simplifying cleaning, maintenance, and replacement of the foam core.

In some implementations, an inner wall of the guide hole 7 is provided with a mounting groove 17, which facilitates installation of the venturi tube sheath 1 and prevents rotational misalignment.

In some implementations, an inner cavity wall of the foam nozzle mounting base 2 is provided with a support ledge 18, which reinforces mounting connection strength of the venturi tube sheath 1.

In some implementations, an inner diameter of the pressure plate adjustment sheath 3 is greater than an outer diameter of the foam nozzle mounting base 2 and an outer diameter greater than an inner diameter of the third limit ledge 15. The connection buckle 13 of the pressure plate adjustment sheath 3 is disposed in the connection slot 11, with an end thereof disposed adjacent to the snap-slot 9 and blocking the notch 12, thereby preventing disengagement of the quick-release knob 4.

Operational principle: The venturi tube sheath 1 is installed by engaging the limit buckle 6 of the limit elastic piece 5 through the mounting groove 17 into the limit hole 10 of the snap-slot 9 at an end of the foam core. The third limit ledge 15 of the quick-release knob 4 is positioned in the snap-slot 9 through the notch 12. The pressure plate adjustment sheath 3 is secured via its connection buckle 13 in the connection slot 11 of the foam nozzle mounting base 2, simultaneously blocking the notch 12 to restrict movement of the third limit ledge 15 of the quick-release knob 4. This configuration prevents accidental disengagement of the quick-release knob 4. By rotating the quick-release knob 4, the third limit ledge 15 operatively dislodges the limit buckle 6 on the limit elastic piece 5 of the venturi tube sheath 1, thereby enabling rapid disassembly and assembly of the venturi tube sheath 1. This structural design facilitates cleaning, maintenance, and replacement of the foam core.

The above embodiments have been described in detail with reference to the accompanying drawings, but the present disclosure is not limited to the described implementations. For those skilled in the art, various modifications, adaptations, substitutions, and variations of these embodiments shall remain within the protection scope of the present disclosure, without departing from the principles and spirit of the present disclosure.

The invention claimed is:

1. A quick-insertion connection structure for an atomizer foam cannon, comprising a venturi tube sheath, a foam nozzle mounting base, a pressure plate adjustment sheath, and a quick-release knob, wherein an end of the venturi tube sheath is provided with a limit elastic piece, and an end of the limit elastic piece is provided with a limit buckle; an end of the foam nozzle mounting base is provided with a guide hole, and an opposite end of the foam nozzle mounting base is provided with a first limit ledge; a snap-slot is disposed between the guide hole and the first limit ledge, the snap-slot being provided with a limit hole adapted to the limit buckle; a connection slot is disposed between the snap-slot and the first limit ledge, and a notch is provided on a side of the snap-slot; an end of the pressure plate adjustment sheath is provided with a connection buckle, the connection buckle being disposed in the connection slot; an end of the quick-release knob is provided with a second limit ledge, an inner cavity wall of the quick-release knob is provided with a third limit ledge, the second limit ledge is disposed on a side of the snap-slot, the third limit ledge is disposed in the snap-slot, and the third limit ledge is adapted to the notch.

2. The quick-insertion connection structure according to claim 1, wherein an end of the guide hole tapers towards an opposite end thereof.

3. The quick-insertion connection structure according to claim 2, wherein an inner wall of the guide hole is provided with a mounting groove.

4. The quick-insertion connection structure according to claim 1, wherein both ends of the third limit ledge are provided with inclined ledge structures.

5. The quick-insertion connection structure according to claim 1, wherein an outer sidewall of the quick-release knob is provided with a plurality of anti-slip ribs.

6. The quick-insertion connection structure according to claim 1, wherein an inner cavity wall of the foam nozzle mounting base is provided with a support ledge.

7. The quick-insertion connection structure according to claim 1, wherein an inner diameter of the pressure plate adjustment sheath is greater than an outer diameter of the foam nozzle mounting base, and an outer diameter of the pressure plate adjustment sheath is greater than an inner diameter of the third limit ledge.

* * * * *